Oct. 22, 1968  W. BRANDSTATTER  3,406,454
GUILLOCHE MACHINE

Filed Jan. 7, 1965  3 Sheets-Sheet 1

Inventor:
Wilhelm Brandstätter
BY
Stevens, Davis, Miller & Mosher
ATTORNEYS

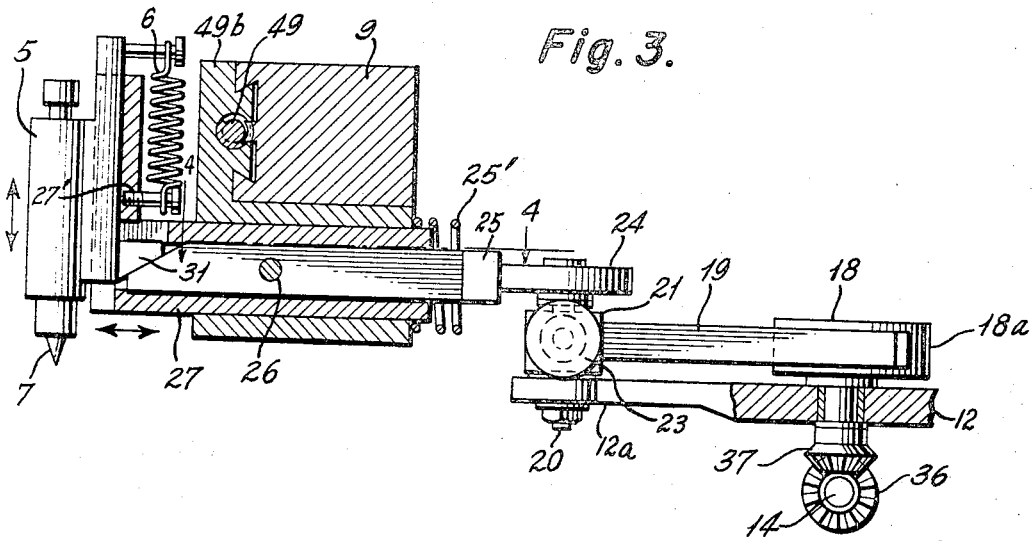
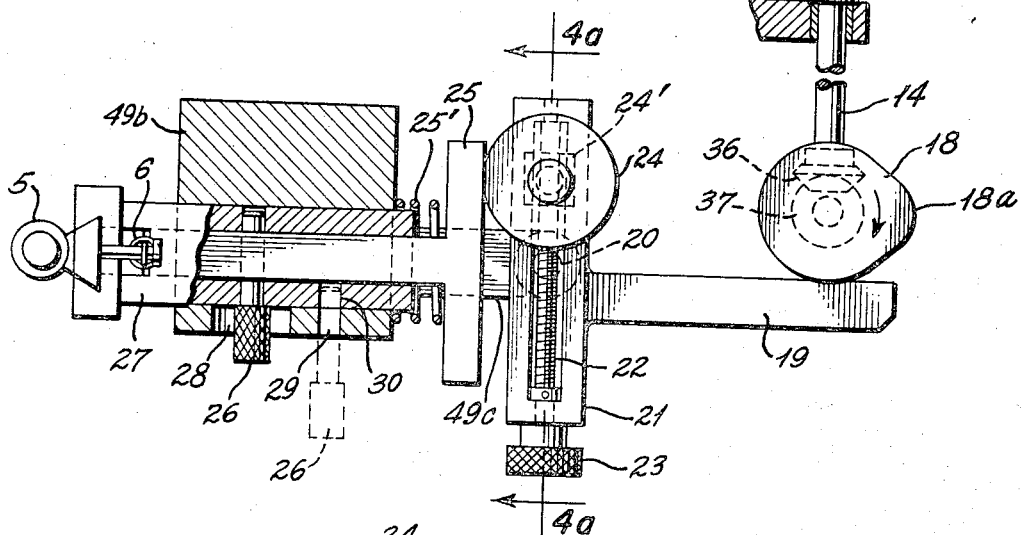
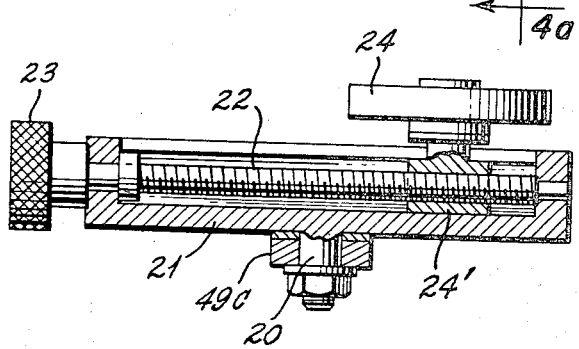

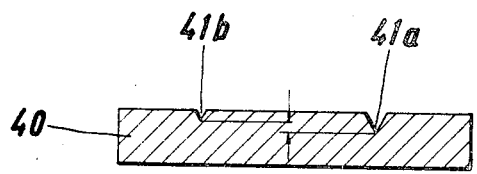
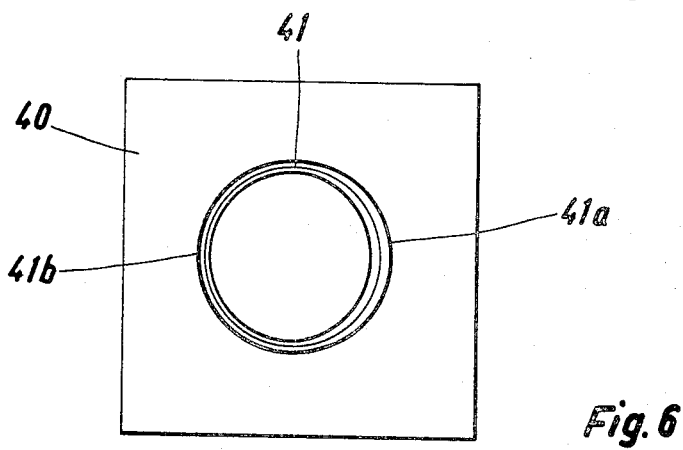
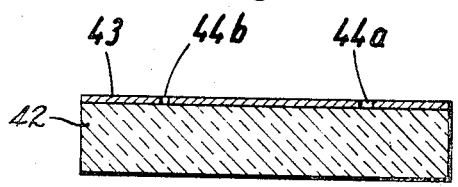
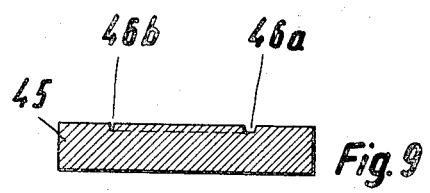
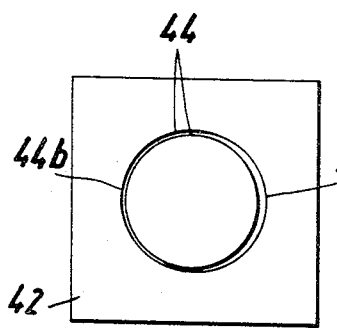
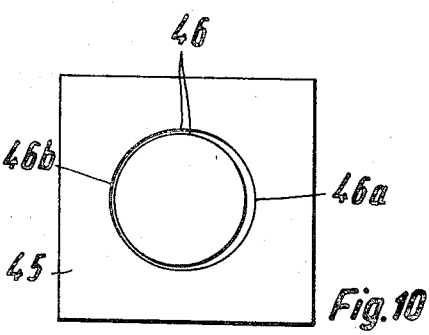

United States Patent Office 3,406,454
Patented Oct. 22, 1968

3,406,454
GUILLOCHE MACHINE
Wilhelm Brandstätter, Frankfurt am Main, Germany, assignor to Firma Maschinenfabrik Michael Kampf KG, Bad Homburg vor der Hohe, Germany
Filed Jan. 7, 1965, Ser. No. 424,082
Claims priority, application Germany, Jan. 16, 1964, M 59,570
12 Claims. (Cl. 33—27)

ABSTRACT OF THE DISCLOSURE

A device in a guilloching machine for imparting to the tool, relative to the workpiece, an additional reciprocating movement whereby the tool will be selectively horizontally or vertically displaced to effect a selected widening of the line scribed. This additional movement will supplement the conventional longitudinal and transverse movements imparted to the tool.

---

Figure 1:
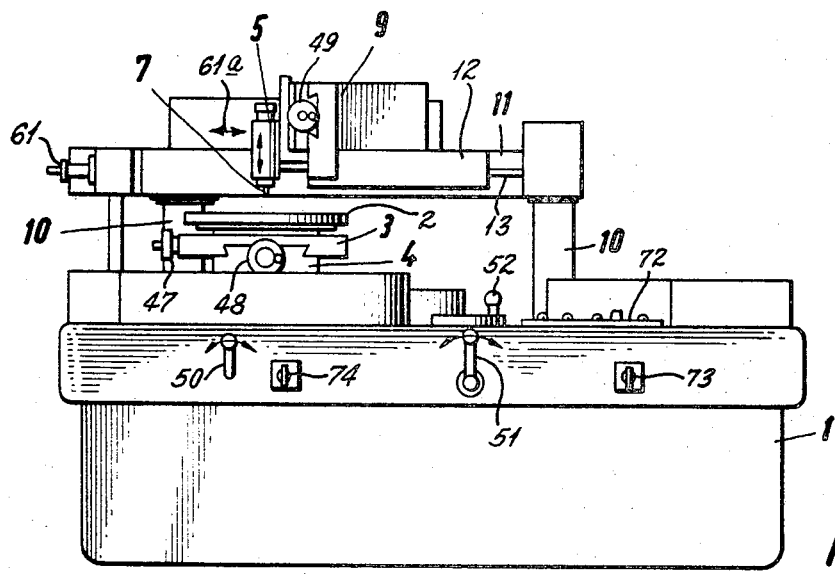

The invention relates to guilloching machines for producing gulloches for securities unit banknotes.

Known machines of this type can produce guilloches of various types and forms, i.e., engrave the same in steel plates or apply them to etching bases, for example coated glass. These guilloches are all formed by lines of the same thickness.

In order to increase the number of different forms of guilloches which can be produced with a guilloching machine and thus make the forging of securities or banknotes provided with such guilloches even more difficult, it is desirable that the wavy lines or loops which form or fill out the guilloches should be thickened, i.e., widened, preferably in such a manner that the thickening exists over only part of the length of the line. The guilloche lines can thus be given a character similar to that of script. This will give the impression that part of the line is a downward stroke.

A large variety of forms can be produced with the devices provided in known guilloching machines which act on the tool and/or the work-table on which the workpiece is clamped. Such devices being, for example, cams of varying types or the like. These devices are unsuitable for thickening the loop or wavy line at any selective place or portion of the loop or wavy line. Therefore, according to the invention, a guilloching machine, in which the tool and/or the work-table used to secure the workpiece perform guide-controlled relative movements, is provided with a device by means of which an additional reciprocating movement is communicated to the tool as it repeatedly passes through the lines. This movement extends horizontally, i.e., in or parallel to the surface of the workpiece and transversely of the first line, i.e., the line produced on the first pass. Since the lines which are required to be thickened are usually curves, it may also be said that the reciprocating additional transverse movement of the tool extends in the direction of the normal at the point of the curve in question.

For guilloches intended mainly to prevent forgery of securities or the like, it is advantageous for the above-mentioned thickenings of the lines to be so arranged that the thickest place is at the top of the wavy lines or loops. The additional individual lines produced by the invention are drawn side by side so as to adjoin one another laterally without any intermediate space or, if required, partially overlap.

The inventive device, which operates in the horizontal direction, is used for the treatment of etching supports, i.e., coated glass, zinc or copper plates; it can also be applied for the engraving of steel plates which are not intended for making direct prints, i.e., transfer plates. Thus, the invention in this form of application does not affect the depth of engraving or penetration.

On the other hand, for metal plates intended for direct printing, for example steel plates, the invention is so applied that the additional reciprocating movement takes place vertically so that the engraving depth is increased accordingly. Thus, the line is widened with the increase of the engraving depth by the conical shape of the cutter.

The vertical movement preferably increases and decreases uniformly. When the line is thickened both horizontally and vertically by an increase of the engraving depth, part of a line is increasingly and decreasingly thickened by a reciprocating movement of the invention, the invention being inoperative when the unthickened parts of the line are passed, i.e., the tool is not deflected from the first part of the line, which may also be referred to as the main part of the line. In the case of horizontal operation the additional lines may be provided optionally on either side or each side of the first or main part of the line.

The invention, by means of which the tool receives an additional reciprocating movement, preferably consists of an eccentric with an adjustable stroke or an eccentric with a fixed stroke and a lever transmission provided between the eccentric and the tool provided with means to vary the eccentric stroke between zero and a maximum.

For the movement in the vertical and horizontal directions it is advantageous to provide a device, according to the invention, which can be so changed over as to impart the reciprocating movements to the tool in one direction or the other.

The invention can be used for the production of a plurality of associated printing plates which contain thickened lines disposed side by side and, if required, partially overlapping, for printing in different colors so that multi-colored thickenings of the guilloche lines are obtained with different colors disposed side by side.

Figure 2:
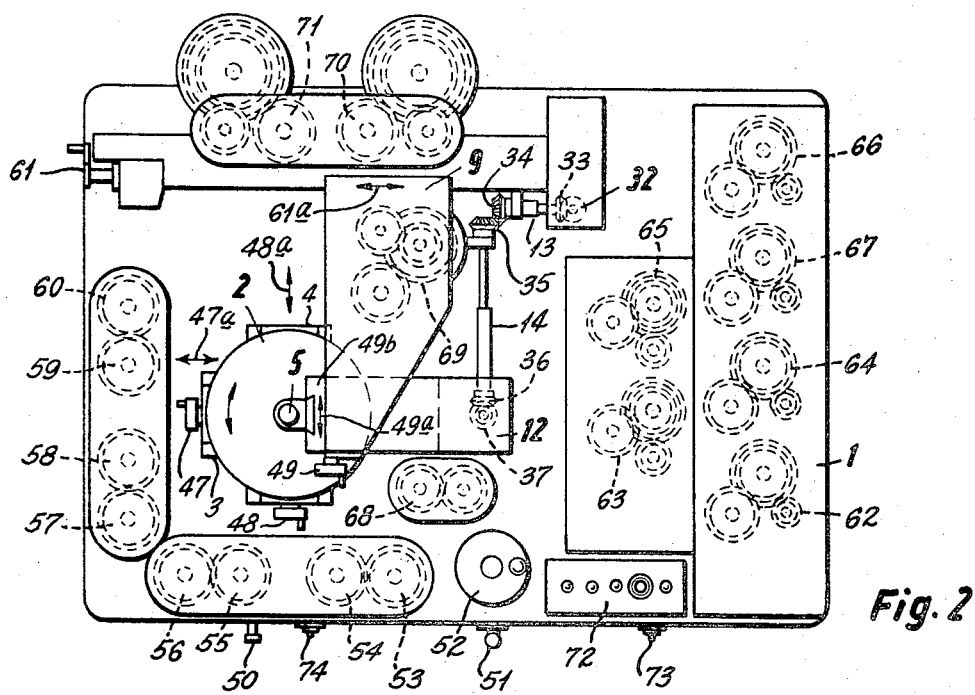

The means by which the foregoing objects and other advantages, which will be apparent to those skilled in the art, are accomplished as set forth in the following specification and claims, and are illustrated in the accompanying drawings dealing with a basic embodiment of the present invention. Reference is made now to the drawings in which:

FIG. 1 is a front elevation of a guilloching machine.
FIG. 2 is a plan view of the guilloching machine according to FIG. 1 with the device according to the invention.
FIG. 3 is a side elevation of details of the inventive device without its housing and partially in section.
FIG. 4 is a partial sectional view of the invention taken along line 4—4 in FIG. 3.
FIG. 4a is a section taken through 4a—4a of FIG. 4.
FIGS. 5 to 10 are sections and plan views of plates with circular lines partially thickened according to the invention.

The base frame 1 (see FIG. 1) is provided with various drive means for the work-table 2 and the engraving tool 7 in the holder 5, together with the adjusting means 47, 48 and 49. The compound rest consisting of the carriages 3 and 4 bears the work-table 2, which is rotatable in horizontal planes and on which the workpiece can be clamped by known means (not shown).

The tool 7 in the holder 5 is slidable longitudinally in the arm 9 (as indicated by the double arrow 49a) which is in turn slidable along the guide 11 (as indicated by the double arrow 61a) transversely of the direction of movement of the holder 5, the guide 11 is spaced at a distance above the top cover plate of the frame by the posts 10. The vertical double arrow on the tool-holder 5 indicates that, as in known machines, the tool 7 may be lifted and lowered as required at the beginning and end of the work or to determine the invariable engraving depth. Handwheel 47 moves, by means of a threaded shaft, the work-table 2 in the directions indicated by the double arrow 47a. Handwheel 48, by similar means, moves the work-table 2 in the directions indicated by double arrow 48a. Thus, by means of the handwheels 47 and 48, an eccentric displacement of the work-table 2 is possible. Handwheel 49, again by means of a spindle, moves the tool holder 5 in the directions indicated by the double arrow 49a. This moves 49b relative to part 9 as shown in FIG. 3.

The other controls illustrated in FIG. 1 are: manual control 50 for connecting and disconnecting the rotational drive means for the work-table 2; lever 51, which, when in the center position, disconnects the power drive means while connecting the manual drive means of the work-table 2, when the lever 51 is moved to the right, the table 2 is rotated clockwise while moving lever 51 to the left produces a counterclockwise rotation of the table 2; and handwheel 52 is a manual drive means for rotation of the table 2.

Sets of gear wheels 53 to 60 and 62 to 71 belonging to the eccentric drive means, are shown schematically as they are under covers. The gears 53 to 60 and 62 to 68 provide the means by which the table 2 may be given a reciprocating movement relative to any side of the machine. Gears 69 to 71 are parts of eccentric drives acting upon the tool holder.

Handwheel 61 is a manual means for moving arm 9 along guide 11 in the directions of the double arrow 61a.

Plate 72 contains the various switches and indicator lamps for the motor drive means.

Switches 73 and 74 provide for internal illumination of the machine.

FIG. 2 shows the housing 12 in place and covering the invention. The drive for the inventive device may be obtained from a separate electric motor but in the example illustrated it is connected to the machine drive by suitable shafts 13 and 14 and the bevel gears 32 to 37. The cam 18a of the cam disc 18 (see FIG. 4), driven via the said shafts and bevel gears, imparts a pivoting movement about point 20 to one arm 19 of the bell crank consisting of arms 19 and 21. A screw spindle 22 is mounted for rotation in the arm 21 of the bell crank which is at an angle of 90° to the arm 19. The spindle can be rotated by means of the knurled knob 23. Rotation of the screw spindle 22 displaces an internally screw-threaded link 24' on which the circular disc 24 is fastened. This is most easily seen in the section view of FIG. 4a. Adjustment of the disc 24 to one or other side of the pivot point 20 of the bell crank adjusts the stroke of the T-shaped element 25. The pivot point 20 is mounted on a stationary extension 12a of housing 12.

The tool-holder 5 is pressed against movable parts of the invention by a spring 6 which acts as a vertical load drawing tool-holder 5 downward so that surface 31 contacts the element 25. Spring 6 is mounted between a stationary extension 27' of part 27 and the movable tool-holder 5. Element 25 is spring loaded by spring 25'. In the embodiment illustrated, the movement of the element 25 may selectively cause the tool-holder 5 to move in either a horizontal or vertical direction. The changeover is obtained by means of the pin 26. When the pin 26 is disposed (as illustrated) in matching bores in the element 25 and in the sleeve 27, the tool 7 moves horizontally, since the head of the pin 26 has sufficient freedom of movement in the slot 28. Element 25, sleeve 27, tool-holder 5 and tool 7 all move horizontally as one unit relative to part 9.

When the pin 26 is fitted (as shown in broken lines) into the coaxial holes 29 and 30, the first of which is in the part 9 and the second in the sleeve 27, such holes matching the cross-section of the pin 26, the movement drive is changed over from horizontal to vertical motion. The front inclined end of the element 25 cooperates with the inclined surface of the part 31 connected to the tool-holder 5 so that the tool 7 is moved vertically. The sleeve 27 is held stationary relative to part 9 so that element 25 alone will move horizontally relative to part 9. Tool-holder 5 will move vertically relative to part 9.

Tool-holder 5 would be moved horizontally as follows: cam disc 18 is rotatably driven by the main drive means through shafts 13 and 14 and bevel gears 32 to 36, each rotation of cam disc 18 brings cam 18a into contact with bell crank arm 19 thus imparting movement of the bell crank about pivot 20. The T-shaped element 25 is biased by spring 25' against disc 24 which is mounted on bell crank arm 21. The pivotal motion of the bell crank about pivot 20 causes disc 24 to move horizontally relative to part 9. The element 25 follows the movement of disc 24 because of the bias of spring 25'. If the disc 24 is positioned as illustrated, the motion of the disc and element 25 will be away from part 9 or towards cam disc 18. With pin 26 positioned as shown, element 25 and sleeve 27 will be moved relative to part 9. The net result will be an extra motion imparted to tool 7 during a portion of its movement over the work surface.

FIGS. 5 and 6 show a steel plate 40 with the circular line 41 whose right-hand part 41a is deepened by vertical additional movement of the tool 7, while the left-hand part 41b has the normal depth. FIGS. 7 and 8 show an etching support, in this case a coated glass plate 42. The latter is provided with the etching coating 43. The circular line is denoted by reference 44. The right-hand part 44a is wider than the left-hand part 44b. The thickening of the line over part of its length is obtained by widening without deepening the engraving. A steel plate not intended for direct printing can be treated similarly. The circular line 46 in steel plate 45 (see FIGS. 9 and 10) has the same depth of engraving on the right and left but is wider at 46a than at 46b. This technique is used, for example, if a white guilloche is required in which the lines remain white and the printing ink is situated between the lines which appear in relief on the printing plate. The engraving depth must therefore be the same throughout.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed is:

1. An improvement in guilloching machines for producing guilloches of selected varying characteristics on workpieces such as plates, paper and the like, and having an engraving tool, a tool holder, a work table for holding said workpiece thereon, support means for mounting said tool holder relative to said work table, and drive means for imparting conventional relative displacement movements in the longitudinal and transverse directions of the work table between said tool and said workpiece, said improvement comprising means operatively connected to said drive means for imparting to said tool and said tool holder an additional movement relative to said workpiece and said support means, said additional movement being selectively parallel with and perpendicular to said work table, said perpendicular additional movement increasing the depth of penetration of said tool into said workpiece to thereby effect a deepening of the line scribed and said parallel additional movement displacing said tool a selected amount across said workpiece upon each pass of said tool on said workpiece subsequent to the initial pass to thereby effect a widening of the line scribed.

2. A guilloching machine according to claim 1, in which said means for imparting additional movement comprises, a sleeve movably mounted in said tool holder, an element movably mounted in said sleeve, means operatively connecting a first end of said element to said drive means, an oblique surface on the other end of said element, a corresponding oblique surface on said tool, means biasing said surfaces into engagement, and means for selectively connecting said sleeve and said element to control the relative movement therebetween, relative movement between said tool and said element surfaces vertically moving said tool and relative movement of said sleeve and element with respect to said tool holder horizontally moving said tool.

3. A guilloching machine according to claim 2, wherein said means operatively connecting said element to said drive means comprises a cam disk driven by said drive means, a bell crank, a first end of said crank engaging with said cam to be moved thereby and the other end thereof engaging with said element to impart movement thereto.

4. A guilloching machine according to claim 3, in which said bell crank comprises means on said other end for adjusting the point of contact between said end and said other end of said element.

5. A guilloching machine according to claim 1, in which the additional movement is imparted to the tool over only part of the total length of the tool movement.

6. A guilloching machine according to claim 1, in which said additional reciprocating movement is so controlled that the individual lines are situated side-by-side to give a thickened total line and whose thickest point may be disposed at any point of any line.

7. A guilloching machine according to claim 6, wherein said individual lines are partially overlapping.

8. A guilloching machine according to claim 6, wherein said thickened total line is disposed at the apex of a curving line.

9. A guilloching machine according to claim 1, wherein said means for imparting an additional movement includes an adjustable eccentric drive.

10. A guilloching machine according to claim 1 wherein said means for imparting an additional movement includes an adjustable lever transmission.

11. A method of producing guilloches on workpieces such as plates, paper, and the like, with a tool which carries out conventional relative basic movements controlled with respect to said workpiece during passage thereover comprising the steps of imparting a basic movement to said tool causing it to move selectively both longitudinally and transversely over said workpiece, and imparting an additional reciprocating movement to said tool selectively parallel with and perpendicular to said workpiece during at least a part of the basic movement thereof thereby selectively varying the chracteristics of the line scribed by said tool including varying width, depth, and horizontal displacement of said line.

12. A method according to claim 11, in which said additional movement is imparted to at least a portion of repeated passages of said tool to result in a thickened line, the thickest point of which can be selectively located for instance at the vertex of an undulatory line.

References Cited

UNITED STATES PATENTS

| | | | |
|---|---|---|---|
| 1,201,513 | 10/1916 | Severy | 33—27 X |
| 1,542,582 | 6/1925 | Raiche | 33—27 |
| 1,848,283 | 3/1932 | Wallace | 33—27 X |
| 2,717,013 | 9/1955 | Van Zwalenburg | 33—41 X |
| 3,002,281 | 10/1961 | Stennes | 33—27 |
| 3,135,051 | 6/1964 | Reuvers et al. | 33—26 |

HARRY N. HAROIAN, *Primary Examiner.*